United States Patent [19]

Stephens et al.

[11] Patent Number: 4,765,794

[45] Date of Patent: Aug. 23, 1988

[54] TRUE LINE BOAT LOADER

[76] Inventors: Cecil L. Stephens, 9816 E. Nora, Spokane, Wash. 99206; Frank G. Stephens, Rte. 1, Box 646, Davenport, Wash. 99122

[21] Appl. No.: 28,751

[22] Filed: Mar. 23, 1987

[51] Int. Cl.⁴ .................................................. B60P 1/52
[52] U.S. Cl. ..................................... 414/534; 414/482; 280/414.1
[58] Field of Search ............... 414/462, 680, 546, 556, 414/498, 529, 530, 531, 532, 533, 534, 482, 535, 536, 469, 495; 280/414.1

[56] References Cited

U.S. PATENT DOCUMENTS

| | | | |
|---|---|---|---|
| 3,608,754 | 9/1971 | Park | 414/534 |
| 3,687,319 | 8/1972 | Adam et al. | 414/482 |
| 4,099,279 | 7/1978 | Park | 414/482 X |
| 4,274,788 | 6/1981 | Sutton | 414/462 |

Primary Examiner—Frank E. Werner

[57] ABSTRACT

This boat loader is designed to aid in the loading of a boat on a trailer. Primarily, it consists of a second frame mounted to a trailer frame, and the second frame includes a hydraulic unit to elevate one end, which is necessary for controlled height when loading a boat, and the second frame is pivotally attached to the trailer frame.

1 Claim, 1 Drawing Sheet

U.S. Patent  Aug. 23, 1988  4,765,794
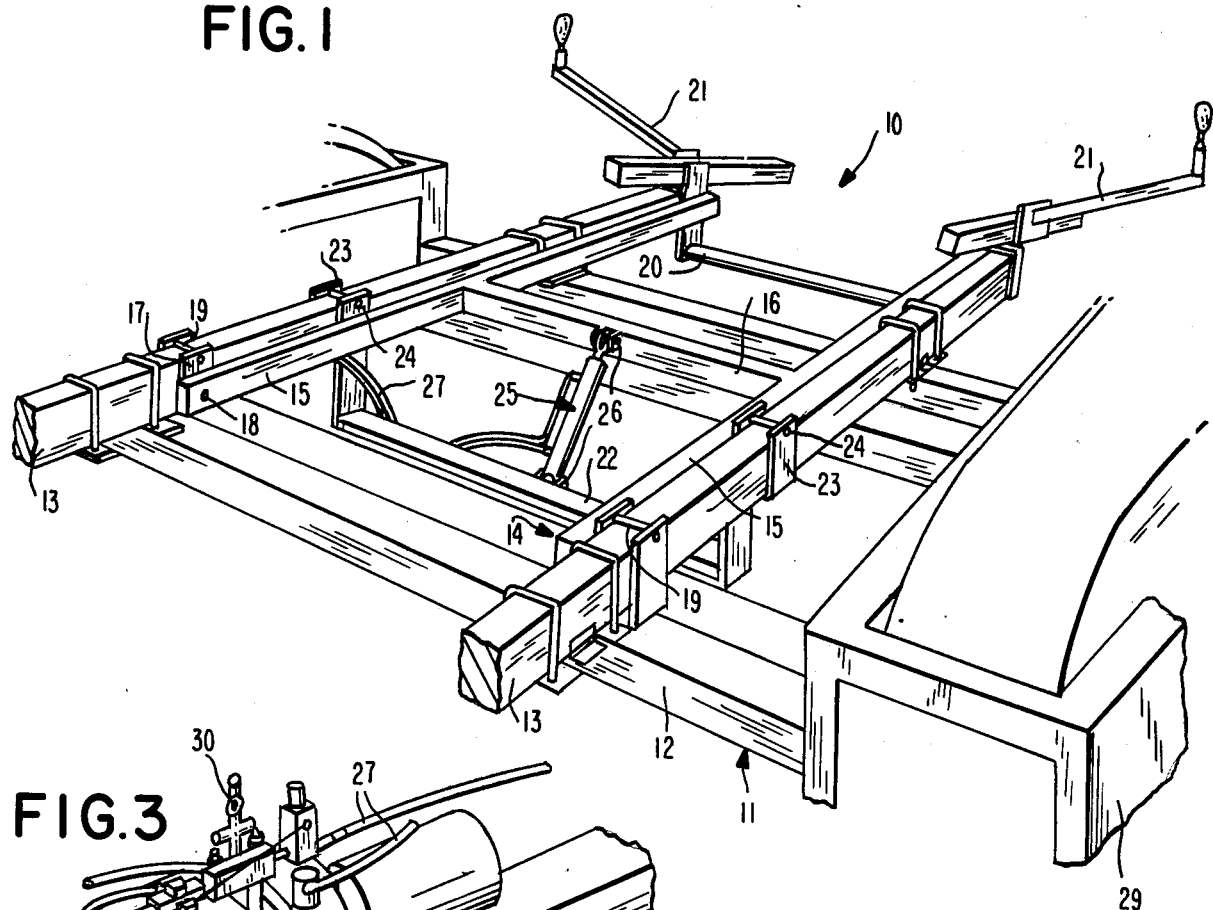
FIG.1
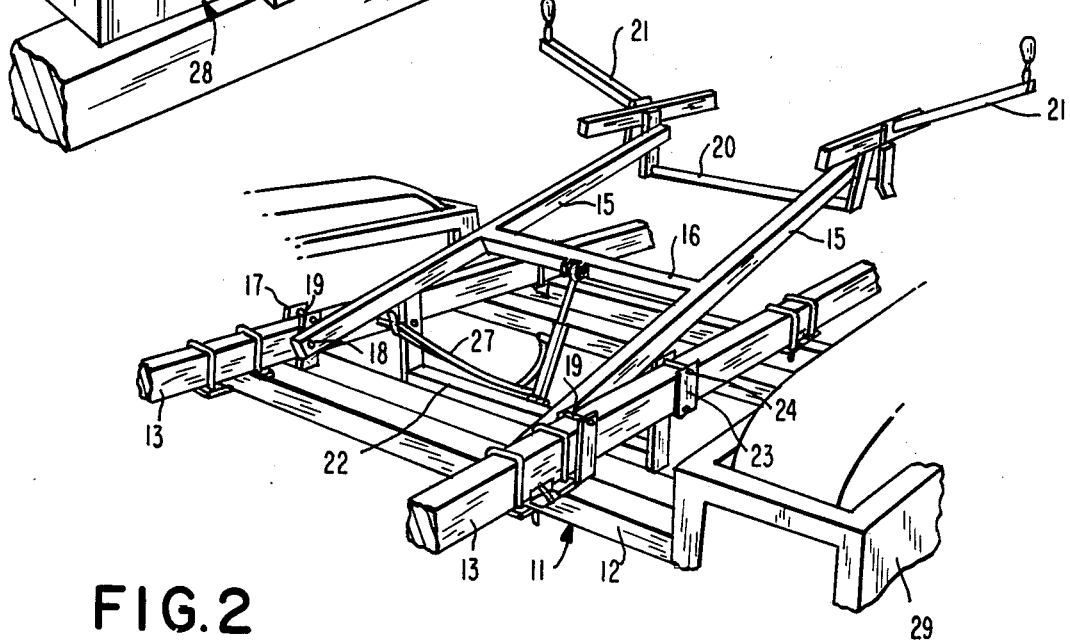
FIG.3
FIG.2

TRUE LINE BOAT LOADER

BACKGROUND OF THE INVENTION

1. Field of the Invention

This invention relates to boat trailers, and more particularly, to a true line boat loader.

2. Description of Prior Art

Boat loaders are known in the art and are of various types to which they are addressed. References are the U.S. Pat. Nos. of Railey 3,458,074, Cox 3,082,892, Thompson 3,298,551, and White 2,828,036.

The principal object of this invention is to provide a true line boat loader, which will be of such design, as to aid in loading boats onto vehicles under all climatic conditions.

Another object of this invention is to provide a true line boat loader, which will be of such construction, as to raise trailer rollers on boats, sixty-two inches above ground level, and it can be adjusted to any elevation by simply stopping a hydraulic unit thereof.

A further object of this invention is to provide a true line boat loader, which will also enable a single person to load a boat easily.

SUMMARY OF THE INVENTION

A boat loader comprises a trailer frame with a pair of rails, mounting a second frame with a hydraulic cylinder, for pivotally lifting the second frame mounting a boat to be transported, and one end of the second frame is pivotally attached to the trailer frame.

DESCRIPTION OF THE DRAWING

FIG. 1 is a perspective view of the present invention;

FIG. 2 is a perspective view of the invention, shown in raised position, and

FIG. 3 is a fragmentary perspective view of the hydraulic unit of the invention.

DETAILED DESCRIPTION

Accordingly, a boat loader 10 is shown to include a trailer frame 11, having cross members 12 secured to its spaced pair of rails 13. A second frame 14 is provided, and includes a pair of spaced smaller rails 15, having a cross bar 16 fixedly secured therebetween. One end of the smaller rails 15 is pivotally mounted to a pair of straps 17 by pins 18, and straps 17 are secured to rails 13 by bolt fasteners 19. A "U"-shaped bar 20 is fixedly secured to the outside ends of rails 15, and the legs of bar 20 are secured to boat handlers 21. Another "U"-shaped bar 22 is fixedly secured to rails 13 by straps 23 receiving bolt fasteners 24, and a hydraulic cylinder 25 is pivotally secured to both cross bar 16 and bar 22, by pivot brackets 26, enabling second frame 14 to be elevated and raised hydraulically. A pair of hydraulic lines 27 are coupled to hydraulic cylinder 25 and a hydraulic unit 28 that may be mounted in any desired location, such as, to a member 28 of the trailer 29.

In use, the control lever 30 is employed to control the hydraulic unit 28, in causing second frame 14 to elevate and descend pivotally about pins 18, when loading and unloading a boat on second frame 14.

While various changes may be made in the detailed construction, such changes will be within the spirit and scope of the present invention, as defined by the appended claims.

What we now claim is:

1. A boat loader, comprising, a trailer frame, said trailer frame including a pair of rails that are spaced apart, a second frame pivotally mounted to said trailer frame, said second frame includes a pair of spaced and shorter rails for the support of a boat, one each of said shorter rails being pivotally secured to said pair of rails of said trailer frame, by pivot pins received through straps secured to said pair of rails of said trailer frame, a cross bar being fixedly secured centrally between said smaller rails and a U-shaped bar, an end having boat guide means thereon, hydraulic means mounted to said trailer frame and said second frame, for elevating one end of said second frame receiving said boat, said hydraulic means including a rearwardly extending hydraulic cylinder secured by pivot brackets to said cross bar and to a bar fixedly secured to said pair of rails of said trailer frame, and a hydraulic control unit being secured to a front end of said trailer frame and providing control means for elevating said second frame at one end, enabling receiving said boat for loading and lowering said second frame and said boat onto said first frame.

* * * * *